United States Patent
Hyun et al.

(10) Patent No.: US 8,831,626 B2
(45) Date of Patent: Sep. 9, 2014

(54) METHOD FOR DETERMINING POSITION BASED ON PORTABLE INTERNET USING RECEIVED SIGNAL STRENGTH INDICATOR AND SYSTEM THEREOF

(75) Inventors: Moon-Pil Hyun, Suwon-si (KR); Hee Jung, Ansan-si (KR); Jin-Won Kim, Seoul (KR); Gyu-In Ji, Seongnam-si (KR); Sun-Yong Kim, Seoul (KR); Chul-Ho Lee, Seoul (KR)

(73) Assignees: Samsung Electronics Co., Ltd. (KR); Konkuk University Industrial Cooperation Corp. (KR)

( * ) Notice: Subject to any disclaimer, the term of this patent is extended or adjusted under 35 U.S.C. 154(b) by 1795 days.

(21) Appl. No.: 11/828,748

(22) Filed: Jul. 26, 2007

(65) Prior Publication Data

US 2008/0026773 A1 Jan. 31, 2008

(30) Foreign Application Priority Data

Jul. 27, 2006 (KR) .................. 10-2006-0070851

(51) Int. Cl.
*H04Q 7/20* (2006.01)
*H04W 64/00* (2009.01)

(52) U.S. Cl.
CPC .................................... *H04W 64/00* (2013.01)
USPC .................... 455/456.1; 455/456.2

(58) Field of Classification Search
USPC .............. 455/436–444, 456.1, 456.2, 456.3, 455/456.4, 456.5, 456.6, 404.1, 67.11, 44
See application file for complete search history.

(56) References Cited

U.S. PATENT DOCUMENTS

| | | | | |
|---|---|---|---|---|
| 6,658,258 B1 * | 12/2003 | Chen et al. | ................ | 455/456.1 |
| 7,047,020 B2 * | 5/2006 | Gerecht | ................ | 455/456.1 |
| 7,218,941 B1 * | 5/2007 | Kubo et al. | ................ | 455/456.6 |
| 7,460,867 B2 * | 12/2008 | Kim et al. | ................ | 455/434 |
| 2005/0064877 A1 * | 3/2005 | Gum et al. | ................ | 455/456.1 |
| 2006/0246918 A1 * | 11/2006 | Fok et al. | ................ | 455/456.1 |
| 2006/0267841 A1 * | 11/2006 | Lee et al. | ................ | 342/463 |
| 2007/0004430 A1 * | 1/2007 | Hyun et al. | ................ | 455/456.1 |
| 2007/0049295 A1 * | 3/2007 | Soliman et al. | ................ | 455/456.3 |
| 2008/0220749 A1 * | 9/2008 | Pridmore et al. | ................ | 455/414.1 |

FOREIGN PATENT DOCUMENTS

| | | |
|---|---|---|
| KR | 1020000038962 | 7/2000 |
| KR | 1020010046125 | 6/2001 |
| KR | 100378124 | 3/2003 |
| WO | WO 96/31076 | 10/1996 |

* cited by examiner

*Primary Examiner* — Myron K Wyche
(74) *Attorney, Agent, or Firm* — The Farrell Law Firm, P.C.

(57) ABSTRACT

Provided are a system and method for determining a position based on portable Internet in a portable Internet system. The method includes receiving, by the terminal, information on neighbor base stations (BSs) from a main BS, scanning the neighbor BSs while measuring Received Signal Strength Indicators (RSSIs) for the main BS and the neighbor BSs, determining whether the RSSI for the main BS is greater than a preset threshold value, and deciding, as a position of the terminal, a position associated with an IDentification (ID) of the main BS when the RSSI is greater than the threshold value.

5 Claims, 2 Drawing Sheets

METHOD FOR DETERMINING POSITION BASED ON PORTABLE INTERNET USING RECEIVED SIGNAL STRENGTH INDICATOR AND SYSTEM THEREOF

PRIORITY

This application claims priority under 35 U.S.C. §119 to an application entitled "Method for Determining Position Based on Portable Internet Using Received Signal Strength Indicator, and System thereof" filed in the Korean Intellectual Property Office on Jul. 27, 2006 and assigned Serial No. 2006-70851, the contents of which are incorporated herein by reference.

BACKGROUND OF THE INVENTION

1. Field of the Invention

The present invention relates generally to a portable Internet (WiBro: Wireless Broadband) system, and in particular, to a system and method for determining a position based on the portable Internet, for enhancing an accuracy of a position of a mobile communication terminal in a portable Internet system.

2. Description of the Related Art

In recent years, the position determination technology has been expanded for application to various fields, such as vehicle and ship navigation and a mobile communication terminal. Popular position determination methods include, for example, determining a position using a Global Positioning System (GPS) signal, and using a signal from a Base Station (BS).

The position determination method using the GPS signal refers to a method for calculating, by a mobile communication terminal equipped with a GPS receiver, a distance between a GPS satellite and the GPS receiver using a code carried on the GPS signal transmitted by the GPS satellite, and determining the position using the distance.

The position determination method based on the signal from the BS is a Time Difference Of Arrival (TDOA) method for calculating a distance between the BS and a mobile communication terminal using pilot signals received from at least three BSs, and determining the position using the calculated distance.

The GPS-based position determination method can easily determine the position because a strength of the GPS signal is high when the sky is clear (or free of obstacles). However, in the circumstances such as downtowns where there are many buildings, a shadow area and the indoors, it is impossible for the method to determine the position because the strength of the GPS signal is weak.

Undesirably, a method for determining a position using a pilot signal cannot detect both a weak pilot signal transmitted by a neighbor BS and a pilot signal on a direct path weakened due to an obstacle, when a mobile communication terminal is located very close to an arbitrary BS. Accordingly, the position determination methods require the development of a technology for enhancing the accuracy of determining the position of the mobile communication terminal.

As described above, the GPS-based position determination method is used because it is easy to acquire the GPS signal when the sky is clear. The position determination method using the pilot signal is used because it is easy to acquire the pilot signals from the neighbor BSs when there exist the sufficient number of neighbor BSs receiving a signal of the mobile communication terminal. However, even in the position determination method using the pilot signal, there may occur the circumstances where the signal of the neighbor BS cannot be detected because the signal transmitted by the BS strengthens in mid course. Under these circumstances, there is a need to provide an improved system and method for exactly estimating the position of the mobile communication terminal.

SUMMARY OF THE INVENTION

It is, therefore, an object of the present invention to provide a system and method for determining a position based on the portable Internet using a Received Signal Strength Indicator (RSSI), for enhancing an accuracy of a position of a mobile communication terminal in a portable Internet system.

To achieve the above and other objects, there is provided a method for determining a position based on portable Internet in a portable Internet system. The method includes, upon a position determination request, receiving, by the terminal, information on neighbor BSs from a main BS, scanning the neighbor BSs while measuring RSSIs for the main BS and the neighbor BSs, determining whether the RSSI for the main BS is greater than a preset threshold value, and deciding, as a position of the terminal, a position associated with an IDentification (ID) of the main BS when the RSSI is greater than the threshold value.

In another aspect of the present invention, there is provided a system for determining a position based on portable Internet, including a main BS for providing information on neighbor BSs, and a terminal for, upon a position determination request, receiving the neighbor BS information from the main BS, scanning the neighbor BSs while measuring RSSIs for the main BS and the neighbor BSs, determining whether the RSSI for the main BS is greater than a preset threshold value, and deciding, as its position, a position associated with an ID of the main BS when it is determined that the RSSI is greater than the threshold value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
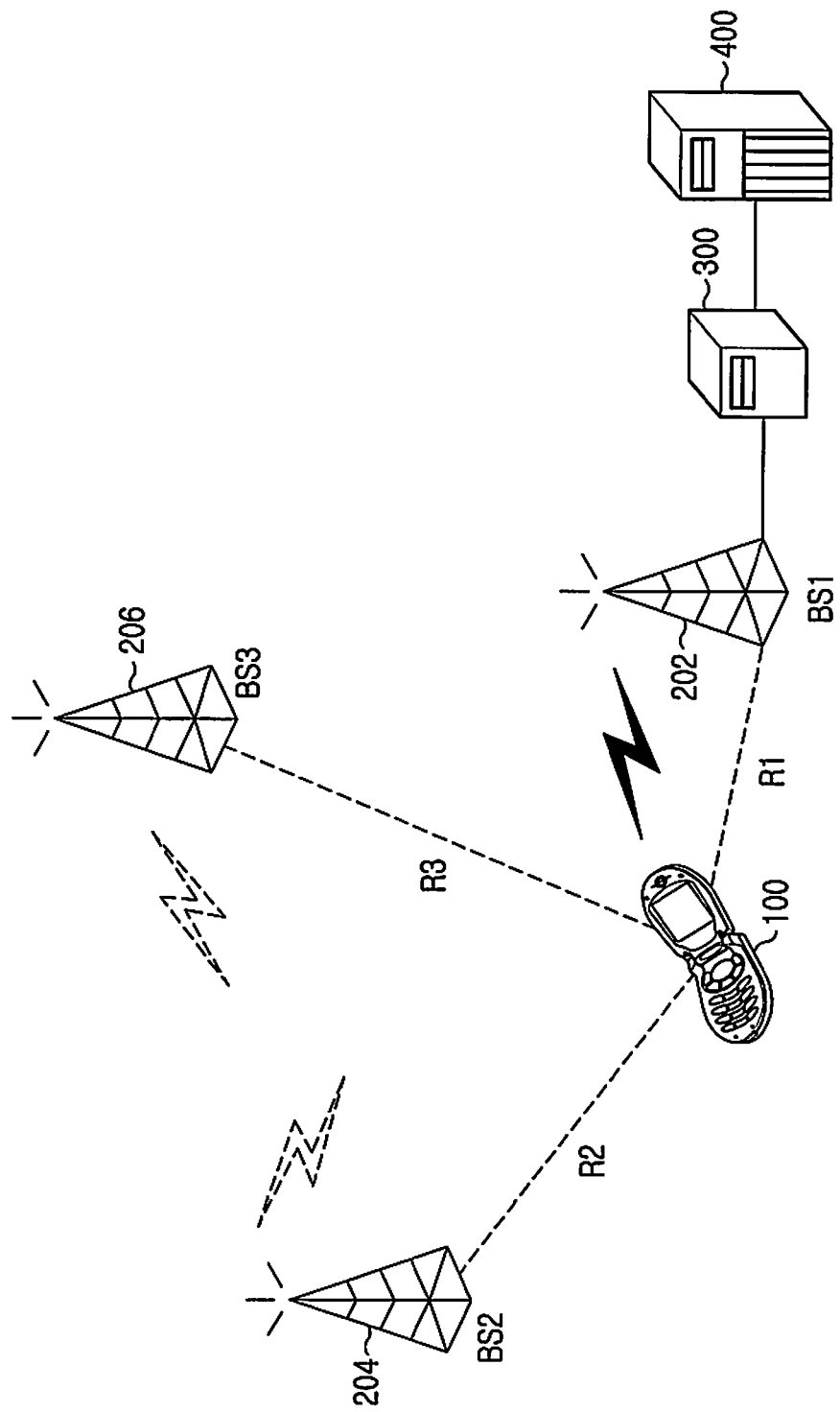
FIG. 1 illustrates the structure of a system for determining a position of a terminal according to a preferred embodiment of the present invention.

A preferred embodiment of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for the sake of clarity and conciseness.

The present invention discloses a method for increasing a success rate for portable Internet-based position recognition, and a positional accuracy. In particular, the present invention discloses a method for increasing an accuracy of position determination when a terminal has difficulty detecting signals transmitted by neighbor BSs because it is located very close to a main (or serving) BS. For this, it is determined herein whether the terminal is located where it is difficult to acquire the signals from the minimal number of neighbor BSs, which are necessary for determining a position of the terminal. Under such circumstances, it is determined whether there is the BS, which has a signal strength greater than a threshold value among the periodically measured strengths of the signals transmitted by the BSs. If there is the BS having the signal strength greater than the threshold value, the position of the terminal is determined considering, as position information of the terminal, position information associated with an ID of the BS.

When it is difficult to apply a Time Difference Of Arrival (TDOA) method needing the signals of at least three BSs, the present invention determines the position of the terminal using the position information of the BS having the signal strength greater than the threshold value, thereby increasing the accuracy of the position determination.

FIG. 1 illustrates a system for determining a position of a terminal according to the present invention. Referring to FIG. 1, the system includes a terminal 100, a main (or serving) BS1 202, neighbor BS2 204 and BS3 206, a BS controller (BSC) 300, and a Position Determination Entity (PDE) 400.

BS1 202 communicates with the terminal 100, and provides information on the neighbor BSs (BS2 and BS3) 204 and 206 of the terminal 100.

The terminal 100 determines whether it needs to scan the neighbor BS2 204 and BS3 206 in response to a position determination request. When it is determined that the terminal 100 needs to scan the neighbor BS2 204 and BS3 206, the terminal 100 transmits a request for information for scanning the neighbor BS2 204 and BS3 206, to the main BS1 202 that is in communication with itself. The terminal 100 receives the information for scanning the neighbor BS2 204 and BS3 206 from the main BS1 202, and scans the neighbor BS2 204 and BS3 206. The scan information includes, for example, a time period required to scan the neighbor BSs in the terminal 100, the number of scans and a scan result reporting method.

After the scanning of the neighbor BSs, the terminal 100 loads, on a report message, a result obtained by scanning the neighbor BSs and relative delay information necessary for position determination, and transmits the report message to the main BS1 202. The report message includes a parameter such as an RSSI mean, a Carrier to Noise plus Interference Ratio (CNIR) mean, and a Round Trip Delay (RTD) mean, as well as the relative delay information and the ID of the neighbor BSs, which is the result obtained by scanning the neighbor BSs. The CNIR refers to a ratio of a signal received from the BS to noise plus interference. Particularly, the relative delay information refers to a value indicating a relative delay between downlink signals received from the neighbor BS2 204 and BS3 206 of the terminal 100. The relative delay information indicates a difference between a time period, which is required for a downlink signal of the main BS1 202 to reach the terminal 100 from the main BS1 202, and time periods, which are required for the downlink signals of the neighbor BS2 204 and BS3 206 to reach the terminal 100 from the neighbor BS2 204 and BS3 206. Specifically, the relative delay information indicates a difference between a time period (T0) and time periods (T1 and T2). The time period (T0) refers to a time period required for the downlink signal of the main BS1 202 to reach the terminal 100 from the main BS1 202. The time periods (T1 and T2) refer to time periods required for the downlink signals of the neighbor BS2 204 and BS3 206 to reach the terminal 100 from the neighbor BS2 204 and BS3 206, respectively.

The present invention uses the RSSI for the BS to more exactly detect the position of the terminal 100. As the terminal 100 moves to a central area of the main BS1 202, the signal transmitted by the main BS1 202 has a greater strength than the signals transmitted by the neighbor BS2 204 and BS3 206. However, under these circumstances, the terminal 100 cannot receive the minimal number of signals necessary for the position determination from the neighbor BS2 204 and BS3 206, due to signal interference. Accordingly, it is difficult to provide the relative delay information necessary for the position determination to the PDE 400, causing a considerable decrease in the accuracy of determining the position of the terminal 100.

Under these circumstances, the terminal 100 uses the RSSI to increase the success rate for the position determination on the periphery of the main BS1 202. In detail, the terminal 100 scans the neighbor BSs while measuring the strengths of the signals received from the main BS1 202 and the neighbor BS2 204 and BS3 206. When the RSSI is less than the preset threshold value, it is indicated that the terminal 100 can receive the minimal number of signals necessary for determining the position of the terminal 100. The terminal 100 loads the result obtained by scanning the neighbor BSs and the relative delay information on the report message, and transmits the report message to the main BS1 202. When the terminal 100 has an application necessary for the position determination, it can also determine its position for itself using the relative delay information and the position information of the BSs.

Alternatively, when the RSSI is greater than the threshold value, it is indicated that the terminal 100 receives the signal at the strength greater than the threshold value because it moves to the central area of the main BS1 202. The terminal 100 loads the ID of the main BS1 202 on the report message, and transmits the report message to the main BS1 202.

The main BS1 202 receives the report message from the terminal 100, and forwards the received report message to the BSC 300. The BSC 300 forwards the received report message to the PDE 400. Alternatively, when the terminal 100 directly accesses the PDE 400, it directly transmits the report message to the PDE 400.

Upon receipt of the report message from the BSC 300, the PDE 400 extracts the relative delay information and the ID of the BS from the received report message, and determines the position of the terminal 100 using the relative delay information and the position information of each BS associated with the ID of the BS. When the report message from the terminal 100 includes the ID of the BS for which the RSSI is greater than the threshold value, the PDE 400 decides the position of the terminal 100 considering, as the position of the terminal 100, the BS position associated with the ID of the base station.

Referring to FIG. 1, the PDE 400 obtains a difference (R2−R1) between a distance (R1) and a distance (R2), and a difference (R3−R1) between the distance (R1) and a distance (R3), using the relative delay information. The distance (R1) represents a distance between the main BS1 202 and the terminal 100. The distance (R2) represents a distance between the neighbor BS2 204 and the terminal 100. The distance (R3) represents a distance between the neighbor BS3 206 and the terminal 100. The PDE 400 can determine the position of the terminal 100, using a triangulation method based on the relative delay information and the position information associated with the ID of each base station. The PDE 400 needs at least two pieces of relative delay information when determining the position of the terminal 100. Alternately, when a result obtained by comparing, by the terminal 100, the threshold value with the measured RSSI is that the measured RSSI is greater than the threshold value, the PDE 400 decides the position of the terminal 100 as the position of the BS.

As described above, the PDE 400 can determine the position using the relative delay information or the ID of the main BS1, and transmit the determined position to the terminal 100. Alternatively, the terminal 100 can also have the application for the position determination, and determine the position for itself.

Figure 2:
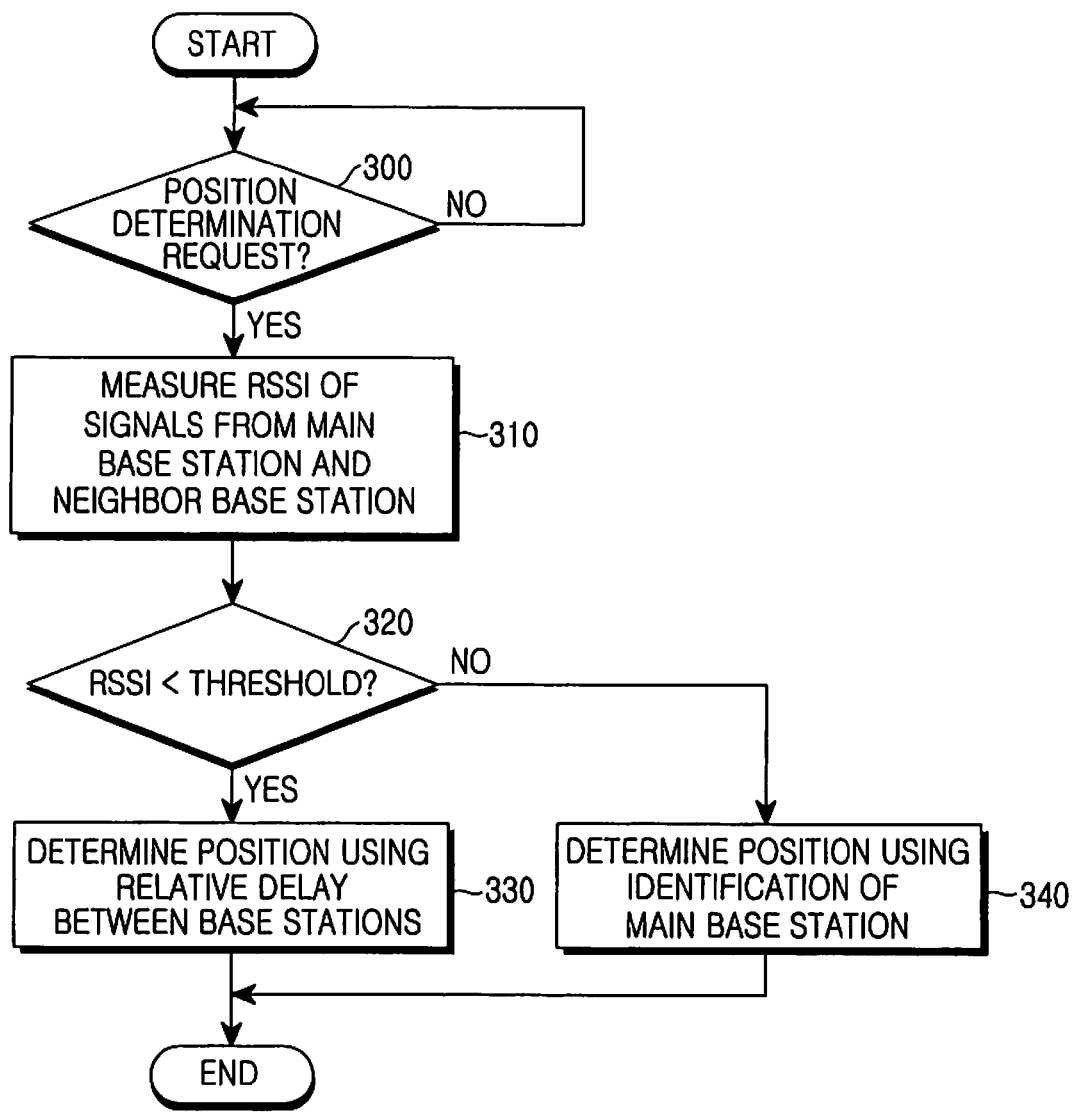
FIG. 2 illustrates a method for determining a position of a terminal using an RSSI according to a preferred embodiment of the present invention.

FIG. 2 is a flowchart illustrating the method for determining the position of the terminal using the RSSI according to an exemplary embodiment of the present invention. Referring to FIG. 2, the terminal 100 determines whether there is the position determination request in Step 300. The position determination request can be implemented by the PDE 400 or a user of the terminal 100. When there is the position determination request, the terminal 100 measures the RSSIs of signals from the main BS and the neighbor BSs in Step 310. The terminal 100 measures the RSSIs using a downlink preamble.

After the measuring of the RSSIs, the terminal 100 determines whether the RSSI for the main BS is less than the preset threshold value in Step 320. When the RSSI is less than the threshold value, the terminal 100 derives and updates a mean value of the RSSI and an estimated value of a standard deviation, and loads them on the report message and transmits the report message to the main BS. When measuring the RSSI, the terminal 100 receives the information for scanning the neighbor BSs from the main BS, scans the neighbor BSs and measures the relative delay information. The information on the neighbor BSs can be used when the position determination request is generated according to a necessity for determining the position of the terminal or a necessity for guaranteeing, by the BS itself, a determination value necessary for determining the position of the terminal. Accordingly, when the terminal 100 has the application for the position determination, it can determine the position for itself using the relative delay information between the BSs in Step 330.

Specifically, referring to FIGS. 1 and 2, when the RSSI is less than the threshold value, the terminal 100 can scan the neighbor BS2 204 and BS3 206, measure the relative delay information between the main BS1 202 and the neighbor BS2 204 and BS3 206, and determine its position for itself using the measured relative delay information. Alternatively, the terminal 100 can transmit the result obtained by scanning the neighbor BS2 204 and BS3 206 to the PDE 400. Thus, the PDE 400 can extract the relative delay information between the main BS1 202 and the neighbor BS2 204 and BS3 206, and the IDs of the main BS1 202 and the neighbor BS2 204 and BS3 206, from the scan result, and determine the position of the terminal 100 using the extracted information. The terminal 100 can transmit the report message including the relative delay information and the like to the PDE 400, and the PDE 400 can determine the position of the terminal 100.

When the report message is transmitted to the PDE 400, statistics of the standard deviation and the mean value of a reception signal loaded on the report message are reported in dBm and dB. The statistics are quantized by an increment of 1 dBm within a range of −40 dBm (coded 0x53) to −123 dBm (coded 0x00), to prepare the report message. A value out of the range is assigned to the closest outer term within a criterion. One method for estimating an RSSI of a target signal in an antenna connector can use Equation (1) below:

$$RSSI = 10^{-\frac{G_{rt}}{10}} \frac{1.2567 \times 10^4 V_c^2}{(2^{2B})R} \left( \frac{1}{N} \sum_{n=0}^{N-1} |Y_{I\ or\ Q}[k,n]| \right)^2 \text{ mW} \quad (1)$$

where
B: degree of Analog-to-Digital Conversion (ADC), or the number of ADC bits,
R: ADC input resistance (ohm),
$V_c$: ADC input clip level (volt),
$G_{rt}$: analog gain up to ADC input from antenna connector,
$Y_{I\ or\ Q}[k,n]$: $n^{th}$ sample at ADC output of I or Q quarter within "k" signal, and
N: number of samples.

When the RSSI for the main BS1 202 is greater than the threshold value in Step 320, the terminal 100 recognizes that it is positioned much closer to the central area of the main BS1 202, and determines its position using the ID of the main BS1 202 in Step 340. Simply, the position of the terminal 100 is decided considering that the terminal 100 is positioned in the BS position associated with the ID of the main BS1 202. The strength of the signal transmitted by the BS increases as a distance from the BS decreases. Thus, the measured RSSI also increases depending on the distance from the BS. Accordingly, the RSSI indicating the strength of the reception signal can be expressed using a correlation with the distance. If the threshold value of the RSSI is decided on the basis of the expression, the position of the terminal 100 is decided as the position of the main BS when the RSSI greater than the threshold value is measured. Accordingly, when it is difficult to detect the signals from the neighbor BSs, the success rate for the position determination on the periphery of the BS is very low. However, when the RSSI is used, the success rate for the position determination can be obtained with a greater accuracy.

As described above, in the present invention, when a condition for receiving effective pilot signals from at least three neighbor BSs is satisfied, the TDOA in which the terminal receives the pilot signals from the neighbor BSs and analyzes their path differences is used, and when the condition for receiving the effective pilot signals is not satisfied, the RSSI is used and the position of the terminal is determined using the ID of the main BS, thereby obtaining a greater success rate for the position determination.

As described above, the present invention can determine whether the number of the searched neighbor BSs is small because of the weak signals of the neighbor BSs, or whether the neighbor BSs cannot be searched because of interference caused by the excessively strong signal of the main BS.

Also, the present invention has an advantage of increasing a performance of the position determination and increasing the accuracy of the position determination, by calculating the position of the terminal using the RSSI to solve a problem of deteriorating the accuracy of the position determination when the signals are not sufficiently acquired from the neighbor BSs due to the excessively strong signal of the main BS.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a position based on portable Internet by a terminal in a portable Internet system, the method comprising the steps of:

receiving, from a main base station, information on neighbor base stations, upon a position determination request;
scanning the neighbor base stations while measuring a Received Signal Strength Indicator (RSSI) for the main base station;
determining whether the RSSI for the main base station is greater than a threshold value;
deciding, as a position of the terminal, a position of the main base station, when the RSSI is greater than the threshold value;
measuring relative delay information between the main base station and the scanned neighbor base stations; and
determining the position of the terminal using the relative delay information and position information of the main base station and the neighbor base stations, when the RSSI is less than the threshold value.

2. A method for determining a position based on portable Internet by a terminal in a portable Internet system, the method comprising the steps of:
receiving, from a main base station, information on neighbor base stations, upon a position determination request;
scanning the neighbor base stations while measuring a Received Signal Strength Indicator (RSSI) for the main base station;
determining whether the RSSI for the main base station is greater than a threshold value;
deciding, as a position of the terminal, a position of the main base station, when the RSSI is greater than the threshold value;
transmitting a result obtained by scanning the neighbor base stations to a Position Determination Entity (PDE), when the RSSI is less than the threshold value;
extracting, by the PDE, relative delay information between the main base station and the neighbor base stations, and Identifications (IDs) of the main base station and the neighbor base stations, which are included in the scan result; and
determining the position of the terminal using the relative delay information and position information of the base stations, when the RSSI is less than the threshold value.

3. A system for determining a position based on portable Internet, the system comprising:
a main base station for providing information on neighbor base stations; and
a terminal for, upon a position determination request, receiving the neighbor base station information from the main base station, scanning the neighbor base stations while measuring a Received Signal Strength Indicator (RSSI) for the main base station, determining whether the RSSI for the main base station is greater than a threshold value, and deciding, as the position of the terminal, a position of the main base station, when it is determined that the RSSI is greater than the threshold value,
wherein when the RSSI is less than the threshold value, the terminal obtains distance differences between its position and positions of the neighbor base stations using the relative delay information between the main base station and the neighbor base stations, and determines its position using the obtained distance differences and position information of the main base station and the neighbor base stations.

4. A system for determining a position based on portable Internet, the system comprising:
a main base station for providing neighbor base station information on neighbor base stations;
a terminal for, upon a position determination request, receiving the neighbor base station information from the main base station, scanning the neighbor base stations while measuring a Received Signal Strength Indicator (RSSI) for the main base station, determining whether the RSSI for the main base station is greater than a threshold value, deciding, as the position of the terminal, a position of the main base station, when it is determined that the RSSI is greater than the threshold value, and transmitting a report message including a scan result, when the RSSI is less than the threshold value; and
a Position Determination Entity (PDE) for receiving the report message from the terminal, and determining the position of the terminal using relative delay information between the main base station and the neighbor base stations, and position information of the main base station and the neighbor base stations.

5. The system of claim 4, wherein when the RSSI is greater than the threshold value, the terminal transmits to the PDE the report message including the position of the main base station, and
the PDE decides, as the position of the terminal, the position of the main base station included in the received report message.

* * * * *